United States Patent
Michelsen

(10) Patent No.: US 7,860,797 B2
(45) Date of Patent: Dec. 28, 2010

(54) METHOD FOR DOCUMENTING PROPERTY OR POSSESSION AND TRANSFER OF PROPERTY OR POSSESSION OF A MERCHANDISE

(75) Inventor: Dirk Michelsen, Hamburg (DE)

(73) Assignee: Thoughtfab Limited, Birmingham (GB)

( * ) Notice: Subject to any disclaimer, the term of this patent is extended or adjusted under 35 U.S.C. 154(b) by 256 days.

(21) Appl. No.: 11/575,269

(22) PCT Filed: Sep. 13, 2005

(86) PCT No.: PCT/EP2005/009834

§ 371 (c)(1), (2), (4) Date: Aug. 12, 2008

(87) PCT Pub. No.: WO2006/029820

PCT Pub. Date: Mar. 23, 2006

(65) Prior Publication Data

US 2008/0301463 A1 Dec. 4, 2008

(30) Foreign Application Priority Data

Sep. 14, 2004 (DE) .................. 10 2004 044 892

(51) Int. Cl.
G06F 21/00 (2006.01)
G06F 12/14 (2006.01)
H04L 9/32 (2006.01)

(52) U.S. Cl. .............. 705/50; 705/64; 705/65; 705/66; 705/67; 726/28; 713/176

(58) Field of Classification Search .............. 726/28; 713/183; 705/50
See application file for complete search history.

(56) References Cited

U.S. PATENT DOCUMENTS

| 3,906,447 A | 9/1975 | Crafton |
| 4,837,822 A | 6/1989 | Crosley et al. |
| 6,058,478 A * | 5/2000 | Davis .................. 713/191 |
| 6,539,480 B1 | 3/2003 | Drews |
| 2004/0088231 A1* | 5/2004 | Davis, Jr. .............. 705/28 |
| 2005/0114270 A1* | 5/2005 | Hind et al. ............. 705/64 |

FOREIGN PATENT DOCUMENTS

| DE | 102 10 765 A1 | 10/2003 |
| FR | 2 747 813 A1 | 10/1997 |
| JP | 2003-091240 A | 3/2003 |
| WO | WO 99/37053 A1 | 7/1999 |

OTHER PUBLICATIONS

Tak, Markus, "Beispielhafte Sicherheit," [Exemplary Security], Card-Forum, Dec. 2002-Jan. 2003, pp. 2-4, Kobil Systems GmbH, Worms, Germany.
Sieber, Robert, "Encrypted File System (EFS),—eingebaute Sicherheit," [Built-in Security], Mar. 5, 2004, http://web.archive.org/web/20040305035654/http://www.different-thinking.de/efs.php.

* cited by examiner

*Primary Examiner*—Taghi T Arani
*Assistant Examiner*—Thaddeus Plecha
(74) *Attorney, Agent, or Firm*—Hunton & Williams LLP

(57) ABSTRACT

A method wherein, by using a storage medium arranged on goods, it is possible to distinctly register a conveyance of ownership or title on this storage medium, and wherein only the current owner or proprietor and possibly also an independent verifying agency has access to the storage medium.

13 Claims, 1 Drawing Sheet

METHOD FOR DOCUMENTING PROPERTY OR POSSESSION AND TRANSFER OF PROPERTY OR POSSESSION OF A MERCHANDISE

CROSS-REFERENCE TO RELATED APPLICATIONS

This application claims the benefit of priority of German Patent Application No. 10 2004 044 892.2 filed Sep. 14, 2004, and International Application No. PCT/EP2005/009834 filed Sep. 13, 2005, which are relied on and incorporated herein by reference.

BACKGROUND OF THE INVENTION

The invention concerns a method for documentation of ownership or title of goods, as well as conveyance thereof.

In modern goods commerce, increased value is being placed on marking the history of a good in electronic form on the good itself. For this purpose, it is known how to apply radio memories, or so-called RFID tags, to the goods.

In one known method for marking of goods, data regarding the goods (such as the type of goods, article number, manufacturer, etc.) are stored all at once on the RFID tags. These data can then be read out by the merchants in various positions of the chain of commerce and be processed in their respective goods tracking systems. In this system, the RFID tags are written on all at once and, in particular, they cannot serve as proof of ownership or title or to negotiate a conveyance of the ownership or title.

Another known method uses the RFID tags in closed user groups, and they can not only be read by the participants of the user group, but also be written upon, at least by selected participants. In order to prevent unauthorized third parties from gaining access to the data stored on the RFID tags, cryptographic techniques are used with this method. One or several or all of the participants of the closed user group receive a key entitling them to read or write on the RFID tags.

This method does not provide a clear assignment of ownership or title, and in particular it is not possible to carry out a conveyance of the ownership or title that is registered on the RFID tag and secure to all parties involved.

Starting from the known methods or systems, the problem of the invention is to provide a method wherein, making use of a storage medium arranged on a good, it is possible to clearly register a conveyance of ownership or title on this storage medium and wherein only the current owner or possessor and possibly also an independent verifying authority has access to the storage medium.

SUMMARY OF THE INVENTION

The basic notion of the invention lies in the use of the familiar technique of encryption by means of pairs of keys. Each participant in this system holds an individual and distinct pair of digital keys, a first digital key, the so-called Public Key, and a second digital key, the so-called Private Key. The first digital key is "intended for the public", i.e., it is issued freely by the holder of the pair of keys. The participant keeps the second digital key secret. With the help of one of these keys, data can now be encrypted so that access to the data can only occur with the help of the other key. This principle of a public key and a private key is used, e.g., in the encryption of emails in electronic correspondence. By "key" in the sense of the invention is meant both a key for the encrypting of a command (with the second digital key), which can only be understood after decryption (with the first digital key), and a signature preceding a command, indicating to the recipient of the command that it comes from an authorized person.

The invention makes use of this principle in that the first digital key of the present owner or possessor of the goods is deposited on the storage medium, and thus only this person (or institution) has access to the storage medium by means of their individual second digital key. This access can, if necessary, be restricted by an appropriate programming of the storage medium in terms of the reading and/or writing of the storage medium. If a conveyance of the ownership or title of the goods should occur, e.g., if a wholesaler sells the goods to a supermarket, the purchaser hands over his first digital key to the seller. He can do this, e.g., by means of a smart card or some other storage medium. The seller then uses his second digital key to write the first digital key of the buyer on the storage medium. The software layout of the storage medium is such that the first digital key of the seller is overwritten with the first digital key of the buyer. In this way, the seller loses the possibility of access to the storage medium and so documents his loss of ownership or title of the goods.

Since the first digital key of the buyer is now saved on the storage medium, the latter gains (possibly limited) access to the storage medium by using his second digital key and can thus be identified as the owner or possessor of the goods.

If the buyer does not have his own pair of digital keys (e.g., in the case of an end consumer buying the goods), the possibility exists in the method of the invention for the seller to place a separate first digital key on the storage medium, for which he does not have any second matching digital key, and which deactivates the storage medium. In this way, the seller distinctly loses the ownership or title of the goods, but the buyer is not distinctly registered as the owner or possessor, but instead it is merely noted that the goods have passed to a buyer who does not have any individual pair of keys.

In one modification of the invention it is possible for the storage medium to acknowledge the completion of the conveyance of ownership or title. This can be done, e.g., by putting out an acoustical or optical signal, and also by transmitting a corresponding electronic acknowledgement message.

"Goods" in the sense of the invention can also be a parcel of individual goods, e.g., a pallet of detergent packages, and in this case the storage medium is applied to the parcel, i.e., the pallet.

According to one advantageous embodiment of the invention, in the case when the buyer does not have his own individual pair of keys, the first digital key placed on the storage medium upon transfer of the goods is the first digital key (Public Key) of an individual pair of keys held by the manufacturer of the storage medium and/or an independent, preferably public institution, so that the manufacturer of the storage medium or the independent institution is able, with the help of their second digital key, to confirm the last transfer of ownership or title and reactivate the storage medium or possibly assign it a new use.

Besides the first digital key of the respective possessor or the separate digital key, in one advantageous modification of the invention additional goods-related data can be saved on the storage medium. The goods are then preferably saved on the storage medium in a structurized format, such as XML. Such data are, e.g., type of goods, article number, place of manufacture, time of manufacture, shelf life, or the like. In this way, the storage medium can replace the commercial or freight documents in paper form still used customarily today. The individual owners or possessors can also place additional data on the storage medium. Thus, e.g., a forwarder, who takes possession of the goods for transport, can protect data such as time of handover and freight route on the storage medium. The storage medium can thus contain the entire history of the goods in digital form. In another advantageous embodiment, it is also possible to save data about the possessors or owners and their sequence in time. In this way, the history of the goods in terms of the possessors and owners is also protected on the storage medium.

In another advantageous embodiment of the invention, a verifying office always has access to the data on the storage medium via a first digital key which is not overwritable and is additionally placed on the storage medium and a second digital key known only to the verifying office. Thus, for example, such a verifying office can be the customs authority, which must be able to read out the data from the storage medium. It is also possible to outfit the police with the second digital key, so that when goods are stolen they can determine the true owner or possessor by reading out the data saved on the storage medium.

As the storage medium, the invention preferably uses a radio-frequency memory chip (RFID tag). RFIDs have the advantage of making do without their own energy supply, so that the corresponding reading devices are already on hand at many dealerships and therefore do not have to be retrofitted.

The invention, furthermore, specifies an electronic storage medium which is designed to be applied to goods, as well as to implement the method of the invention. The storage media for the method of the invention are typically provided by the manufacturer of the storage media either with the first digital key of the manufacturer of the storage medium or with the first digital key of the manufacturer of the goods at first or they are provided at the same time with the first digital key of the first dealer ordering the goods from the manufacturer. When programming the storage medium, the above described protocol of the change of owner or possessor is already organized. That is, a pathway for the depositing of the first digital key has been organized on the storage medium and the storage medium is designed so that the already present first digital key is overwritten under this pathway when a new first digital key is put in.

DETAILED DESCRIPTION OF THE INVENTION

Figure 1:
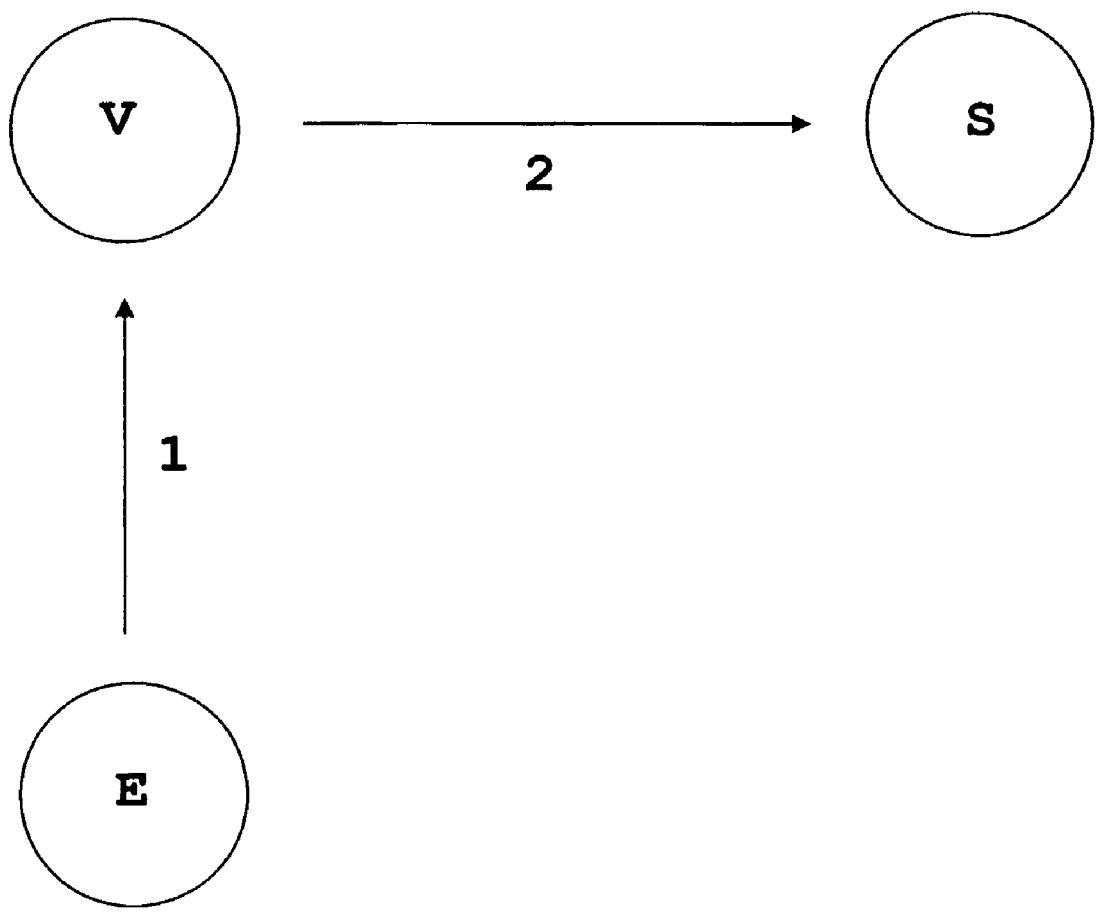
FIG. 1 is a schematic diagram illustrating a protocol for the transfer of ownership or title of the goods, where the new owner or possessor has their own pair of digital keys.

Referring to FIG. 1, buyer E, who would like to buy the ownership or title of the goods, first hands over to the former owner or proprietor, the seller V, his first digital key (Public Key). This is indicated by the arrow designated as 1. The seller V uses his own second digital key (Private Key) to overwrite his first digital key (Public Key) on the storage medium S with the first digital key of the buyer E. With this, the conveyance of the title or ownership is already fully and safely carried out. By overwriting his first digital key, the seller V loses his ability and rights of accessing the storage medium S. Since the first digital key of the buyer E is now saved on the storage medium S, he gains the ability to access the storage medium S by using his appropriate second digital key.

The method makes possible a provable tracking of the ownership or title of goods in an open user group. Each participant brings in his own individual pair of digital keys of a first digital key (Public Key) and second digital key (Private Key). These pairs of keys are not centrally issued or administered, but instead can be created by each participant himself, possibly in the framework of certain technically conditioned ground rules, e.g., making use of a so-called pass phrase. Participants without their own pair of digital keys can also take part in this system by using the separate first digital key for their purchase of the goods.

The invention claimed is:

1. A method for documentation of an ownership or title of a good and also the conveyance of same comprising:
    providing the good with a radio-frequency storage tag having an overwritable electronic storage medium accessible by a first pair of digital keys, wherein the first pair of digital keys includes a first digital key stored on the storage medium and a second digital key enabling a first owner or proprietor read and write access to the storage medium; and
    enabling the storage medium to document a change of ownership or title of the good from the first owner or proprietor to a second owner or proprietor by the second owner or proprietor providing the first owner or proprietor a first digital key of a second pair of digital keys, and the first owner or proprietor completes the transfer of title or ownership of the good by using the first owner or proprietor's second digital key to overwrite the first owner or proprietor's first digital key saved on the storage medium with the first digital key of the second pair of digital keys to enable the second owner or proprietor to further change ownership or title to a subsequent owner by obtaining read and write access to the storage by using a second digital key of the second pair of digital keys; and
    enabling locking and deactivation of the storage medium to further reading and writing by any subsequent owner or proprietor of the good using a second digital key from a pair of keys to overwrite a previous owner or proprietor's first digital key on the storage medium with a locking digital key that locks and prevents the storage medium from permitting further reading or writing by a subsequent owner while deactivated;
    wherein the locking digital key is the first digital key of an individual pair of keys of a third party that includes a second digital key permitting the third party to unlock and reactivate the storage medium.

2. A method according to claim 1, wherein each of the first digital keys of each pair of keys is a public encryption key and the second digital keys of each pair of keys is a private encryption key.

3. A method according to claim 1, wherein goods-related data selected from the group consisting of commercial documentation data, freight documentation data and combinations thereof is saved on the storage medium.

4. A method according to claim 1, wherein goods-related data selected from the group consisting of type of goods, article number, place of manufacture, time of manufacture, shelf life and combinations thereof is saved on the storage medium.

5. A method according to claim 1, wherein data about the possessors or owners and their sequence in time is saved on the storage medium.

6. A method according to claim 1, further comprising enabling a verification agency at least read access to the storage medium by maintaining on the storage medium an additional first digital key of an additional pair of digital keys that enables at least read access by using an additional second digital key of the additional pair of keys.

7. A method according to claim 1, wherein data about the possessors or owners and their sequence in time is saved on the storage medium.

8. A method according to claim 1, wherein goods-related data selected from the group consisting of commercial documentation data, freight documentation data and combinations thereof is saved on the storage medium.

9. A method according to claim 1, wherein a radio-frequency storage tag is used as the storage medium.

10. A method for documentation of an ownership or title of a good and also the conveyance of same comprising:

providing the good with a radio-frequency storage tag having an overwritable electronic storage medium including a first digital key of an individual pair of keys, wherein the pair of keys includes the first digital key and a second digital key of an owner or proprietor of the good, and wherein the owner or proprietor has read and write access to the storage medium by using the second digital key; and changing ownership or title to the good using the second digital key by overwriting the first digital key on the storage medium with a separate locking digital key that locks, deactivates and prevents the storage medium from further reading or writing by the owner or proprietor and subsequent owners or proprietors while deactivated, wherein the separate locking digital key is a public locking digital key of a third party's pair of keys that includes a second digital private unlocking key permitting the third party to unlock and have at least read access to the storage medium.

11. A method according to claim 10, wherein the third party is selected from the group consisting of the manufacturer of the good, an independent institution and a verification agency.

12. A method according to claim 11, wherein goods-related data selected from the group consisting of type of goods, article number, place of manufacture, time of manufacture, shelf life and combinations thereof is saved on the storage medium.

13. A method according to claim 10, wherein goods-related data selected from the group consisting of type of goods, article number, place of manufacture, time of manufacture, shelf life and combinations thereof is saved on the storage medium.

* * * * *